(12) United States Patent
Adis et al.

(10) Patent No.: US 8,925,199 B2
(45) Date of Patent: Jan. 6, 2015

(54) SYSTEMS AND METHODS AND APPARATUS INVOLVING FABRICATING BRUSH SEALS

(75) Inventors: William Edward Adis, Scotia, NY (US); Bernard Arthur Couture, Jr., Schenectady, NY (US); Marshall Gordon Jones, Scotia, NY (US); Michael Dennis Mack, Ballston Spa, NY (US); Daniel Frederick Purdy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 13/185,266

(22) Filed: Jul. 18, 2011

(65) Prior Publication Data
US 2011/0272891 A1    Nov. 10, 2011

Related U.S. Application Data

(62) Division of application No. 12/366,831, filed on Feb. 6, 2009, now Pat. No. 8,051,563.

(51) Int. Cl.
*B23Q 3/00* (2006.01)
*F01D 11/02* (2006.01)
*F16J 15/32* (2006.01)

(52) U.S. Cl.
CPC .................................. *F16J 15/3288* (2013.01)
USPC ............................. 29/888.3; 29/464; 277/355

(58) Field of Classification Search
CPC . F01D 11/0001; F01D 11/02; F05D 2240/56; F16J 15/153288; F16J 15/3288; F16J 15/442; Y02T 50/672
USPC ................... 29/428, 464, 888.3; 219/121.14, 219/121.64; 228/182; 277/355
See application file for complete search history.

(56) References Cited

U.S. PATENT DOCUMENTS

| | | | |
|---|---|---|---|
| 4,204,629 A * | 5/1980 | Bridges | 228/160 |
| 4,274,575 A | 6/1981 | Flower | |
| 4,642,867 A * | 2/1987 | Hough et al. | 29/423 |
| 4,678,113 A * | 7/1987 | Bridges et al. | 228/160 |
| 4,730,876 A | 3/1988 | Werner et al. | |
| 4,934,759 A * | 6/1990 | Bridges | 300/11 |

(Continued)

FOREIGN PATENT DOCUMENTS

| | | |
|---|---|---|
| EP | 0192477 A2 | 8/1986 |
| EP | 1347217 A2 | 9/2003 |

(Continued)

OTHER PUBLICATIONS

Search Report and Written Opinion from EP Application No. 10152252.2 dated Apr. 19, 2012.

(Continued)

*Primary Examiner* — Alexander P Taousakis
(74) *Attorney, Agent, or Firm* — Cantor Colburn LLP

(57) ABSTRACT

A method for fabricating a brush seal assembly comprising, bending a first plate member to a helical shape, bending a second plate member to a helical shape, securing the first plate member to a drum, winding a wire material around the drum and the first plate member, securing the second plate member to the drum, attaching the second plate member and the first plate member to the wire, and cutting the wire to define a bristle length.

10 Claims, 19 Drawing Sheets

(56) References Cited

U.S. PATENT DOCUMENTS

| | | | |
|---|---|---|---|
| 5,165,758 A * | 11/1992 | Howe | 300/21 |
| 5,183,197 A | 2/1993 | Howe | |
| 5,403,071 A | 4/1995 | Hostetler et al. | |
| 5,556,172 A | 9/1996 | Howe | |
| 6,062,463 A | 5/2000 | Hoffmueller et al. | |
| 6,109,616 A | 8/2000 | Mayr | |
| 6,120,622 A | 9/2000 | Mayr et al. | |
| 6,257,588 B1 | 7/2001 | Bagepalli et al. | |
| 6,996,885 B2 | 2/2006 | Szymbor et al. | |
| 7,255,352 B2 | 8/2007 | Adis et al. | |
| 7,334,311 B2 | 2/2008 | Addis | |
| 7,653,993 B2 | 2/2010 | Couture et al. | |
| 8,051,563 B2 * | 11/2011 | Adis et al. | 29/888.3 |
| 8,069,562 B2 * | 12/2011 | Couture et al. | 29/888.3 |
| 2006/0130323 A1 * | 6/2006 | Szymbor et al. | 29/888.3 |
| 2007/0214628 A1 * | 9/2007 | Adis et al. | 29/428 |
| 2008/0122183 A1 | 5/2008 | Braun et al. | |
| 2008/0224415 A1 * | 9/2008 | Flaherty et al. | 277/355 |
| 2013/0168926 A1 * | 7/2013 | Cui et al. | 277/355 |

FOREIGN PATENT DOCUMENTS

| | | | |
|---|---|---|---|
| JP | 2000503374 A | 3/2000 | |
| JP | 2006132773 A | 5/2006 | |
| RU | 1462917 A1 | 11/1996 | |

OTHER PUBLICATIONS

Unofficial English translation of JP Office Action dated Jan. 28, 2014, issued in connection with corresponding JP Application No. 2010-020822.

EP Search Report and Opinion dated Jan. 30, 2012 from corresponding EP Application No. 10152252.2.

* cited by examiner great precision by hand. The brush seal assembly 102 described below is fabricated using a system and method that improves the efficiency and quality of the brush seal assemblies 102.

SYSTEMS AND METHODS AND APPARATUS INVOLVING FABRICATING BRUSH SEALS

CROSS REFERENCE TO RELATED APPLICATIONS

This is a divisional application of application Ser. No. 12/366,831, filed Feb. 6, 2009, now U.S. Pat. No. 8,051,563, issued Nov. 8, 2011.

BACKGROUND OF THE INVENTION

The subject matter disclosed herein relates to fabricating brush seals.

Brush seals include a plurality of wire bristles attached to a plate assembly that form a brush. The brush contacts a rotating component of a turbine to seal one section of a turbine from another section.

Previous methods of fabricating brush seals use manual techniques that are inefficient and imprecise. A method and system for efficiently fabricating brush seals is desired.

BRIEF DESCRIPTION OF THE INVENTION

According to one aspect of the invention, a method for fabricating a brush seal assembly comprising, bending a first plate member to a helical shape, bending a second plate member to a helical shape, securing the first plate member to a drum, winding a wire material around the drum and the first plate member, securing the second plate member to the drum, attaching the second plate member and the first plate member to the wire, and cutting the wire to define a bristle length.

According to another aspect of the invention, a system for fabricating a brush seal assembly comprising, a drum member having an axis of rotation and a surface partially defining an outer diameter of the drum member, an alignment portion disposed on the surface operative to align and secure a front plate member and a back plate member of a brush seal assembly along a helical curve.

According to another aspect of the invention, a brush seal assembly comprising, a first plate having an inner surface and an outer surface, a second plate having an inner surface and an outer surface, and a wire bristle secured between the outer surface of the first plate and the inner surface of the second plate, a third plate having a castellated radially outer surface partially defining a notch having a radially outer notch surface, and a first weld operative to join the radially outer notch surface of the third plate and the outer surface of the first plate.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
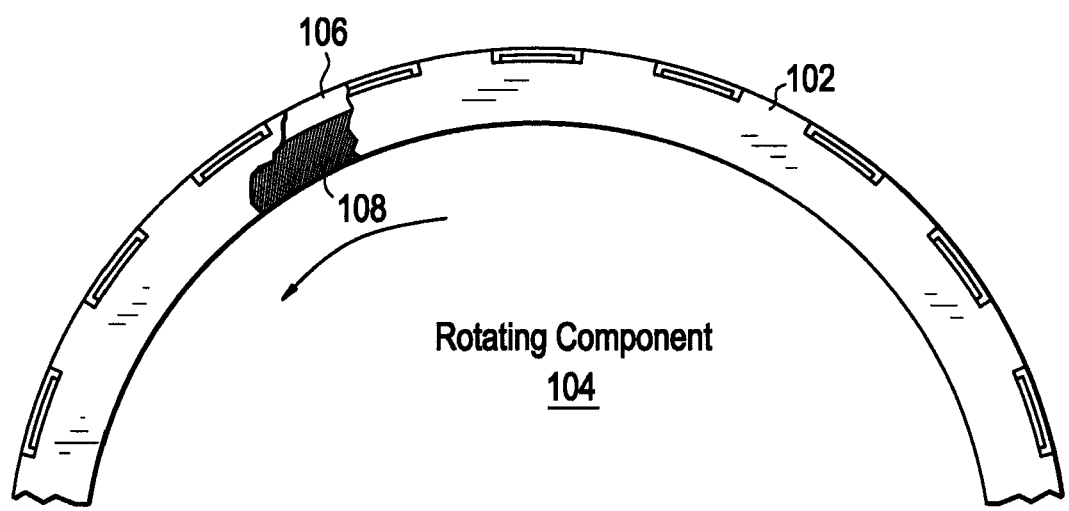
FIG. 1 is an exemplary embodiment of a brush seal assembly.

FIG. 1 illustrates an exemplary embodiment of a brush seal assembly 102. The brush seal assembly 102 includes plates 106 that secure wire bristles 108. A number of brush seal assemblies 102 are disposed in a groove of a packing ring or stator of a turbine to form a ring around a rotating component 104 that seals one section of the turbine from another section of the turbine. Ends of the wire bristles 108 contact the rotating component 104. The wire bristles 108 are orientated at an angle (bristle lay angle) relative to the tangent of rotary component 104 and the plates 102 that increases the compliance of the seal as the rotating component 104 rotates.

Previous methods for fabricating the brush seal assembly 102 included receiving the specifications for the brush seal assembly 102 and assembling each brush seal assembly 102 individually. The process included placing the wire bristles 108 or tufts of bristles at a desired bristle lay angle by hand, and welding the plates together to secure the bristles. Additional machining processes were then performed to fabricate a completed brush seal assembly 102. The previous processes were inefficient because they were labor intensive and wasted costly materials. The processes were imprecise because the spacing and angle of the bristles are difficult to lay with precision by hand. The methods and systems described below offer an efficient and precise process for fabricating brush seals.

Figure 2:
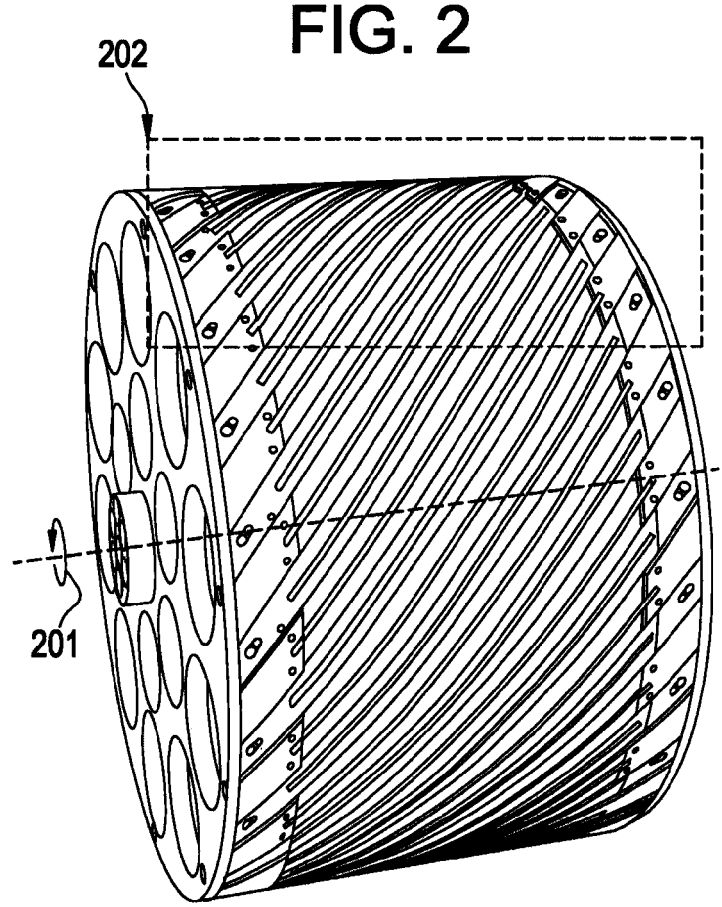
FIGS. 2 and 3 are an exemplary embodiment of a drum member.
Figure 3:
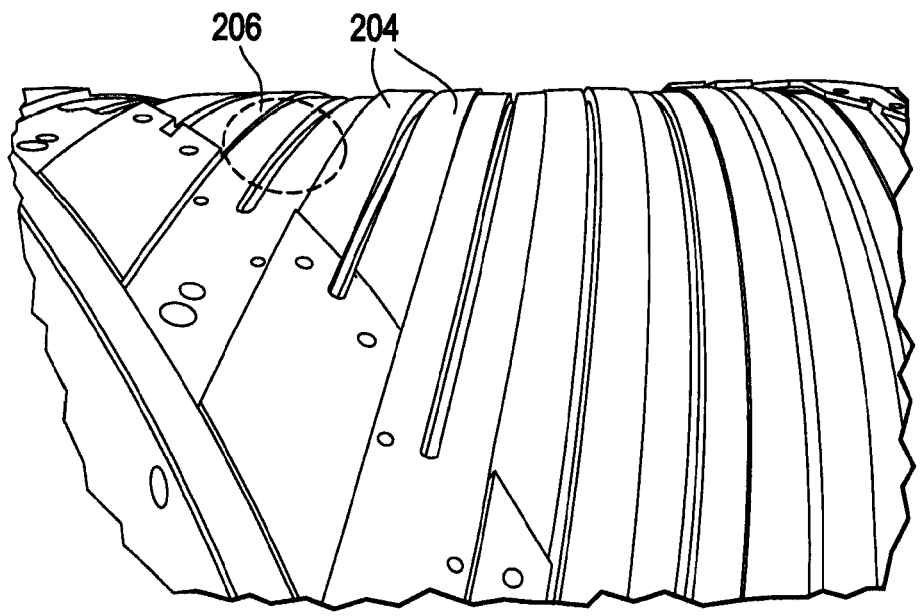

FIGS. 2 and 3 illustrate an exemplary embodiment of a drum member 202 having an axis of rotation 201. The drum member includes an outer portion having a surface 204 that defines an outer diameter of the drum member 202. The drum member 202 includes an alignment portion 206 that aligns plates of the brush seal assembly 102 (of FIG. 1). The illustrated embodiment includes an alignment portion 206 having channels that are machined in the drum member 202. Embodiments may include other alignment features such as, for example, pins, notches, grooves, or recesses. The alignment portion 206 is orientated at an angle relative to the axis of rotation 201 and follows the curvature of the drum member 202. The angle corresponds to the bristle lay angle of the completed brush seal assembly 102 and is determined in part by the design specifications of the brush seal assembly 102. The alignment portion 206 follows the curvature of the drum member 202, such that the alignment portion 206 is a helical shape.

Figure 4:
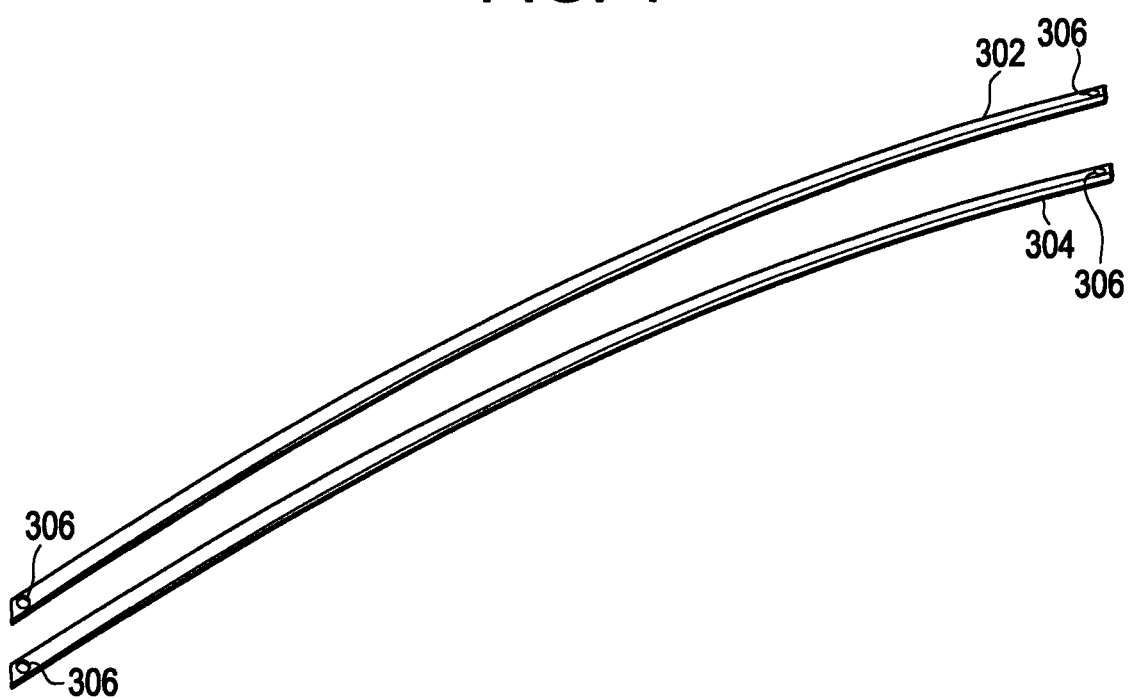
FIG. 4 is an exemplary embodiment of a back plate and a front plate of the brush seal assembly of FIG. 1.

FIG. 4 illustrates an exemplary embodiment of a back plate 304 and a front plate 302 of the brush seal assembly 102 (of FIG. 1). The back plate 304 and front plate 302 secure bristles of the brush seal assembly 102. When assembled, bristles are sandwiched between the back plate 304 and front plate 302, and the back plate 304, front plate 302, and bristles are held together with a weld or a braze. The back plate 304 and front plate 302 are fabricated from material (e.g., stainless steal, carbon steal, cobalt based alloy, nickel based alloy, aluminum alloy, titanium alloy, copper alloy) having a rectangular profile that may be machined in later processes. The back plate 304 and front plate 302 include alignment features 306 that may include for example, holes, slots, or notches. Slotted holes may be used to accommodate thermal expansion which may occur during welding. The alignment features are used to align the back plate 304 and front plate 302 with the alignment portion 206 of the drum member 202. In alternate embodiments, the back plate 304 and front plate 302 may be disposed along an edge of the grooves in the drum member 202 and secured using hardware. Since the alignment portion 206 secures the back plate 304 and front plate 302 along a helical shaped curve, the back plate 304 and front plate 302 are bent to match the helical shaped curve of the alignment portion 206. The back plate 304 and front plate 302 may be bent using, for example, a die press or rollers.

Figure 5:
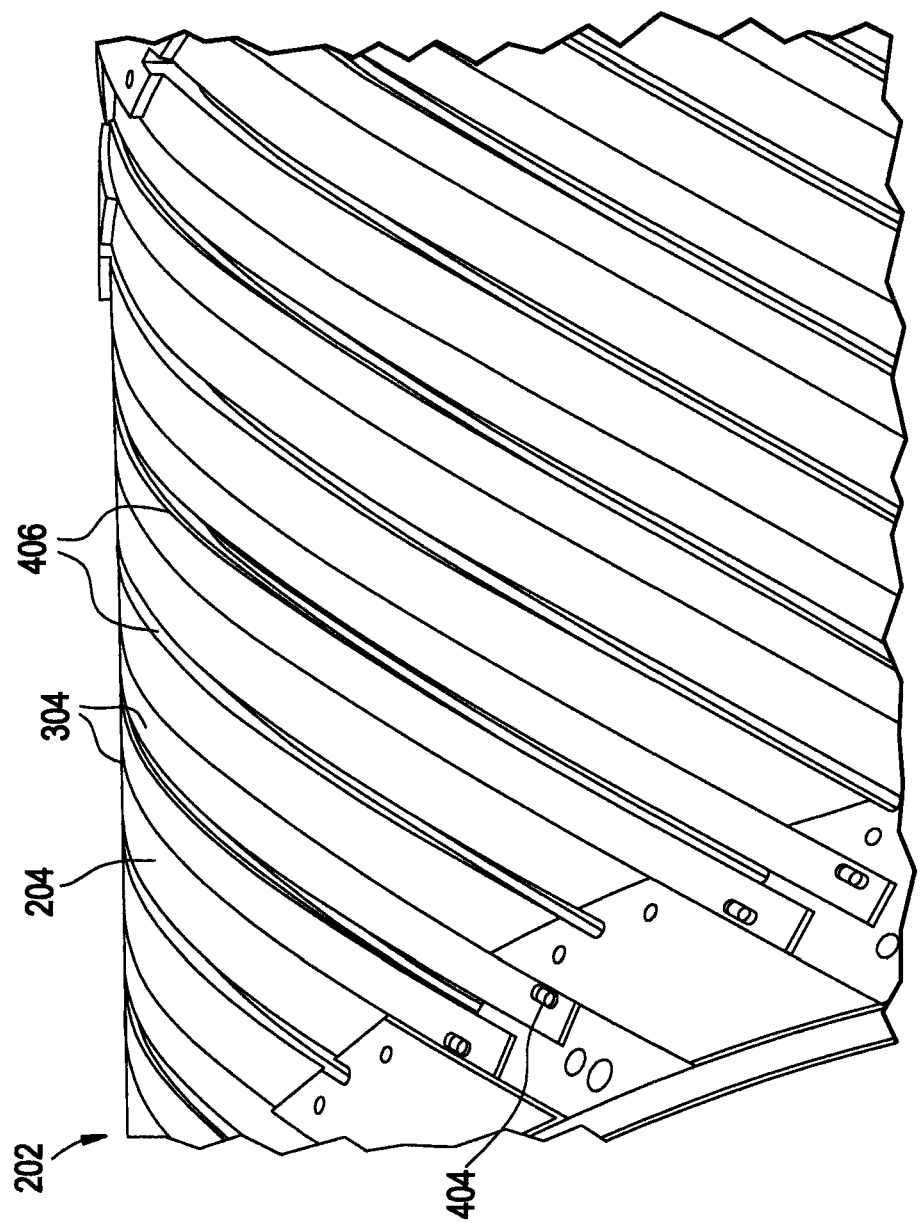
FIG. 5 is a portion of the drum member with back plates assembled.

FIG. 5 illustrates a portion of the drum member 202 with a plurality of back plates 304 disposed in the alignment portions 206. The back plates 304 conform to the helical shape of the alignment portions 206. The alignment portions 206 may include pins 404 that engage the alignment features 306. The back plates 304 may be secured to the drum member 202 with fasteners, clamps, or other securing techniques. The drum member 202 also includes a plurality of cutting channels 406 that are machined along a helical shape similar to the alignment portions 206. The cutting channels 406 facilitate the cutting of wire (discussed below).

Figure 6:
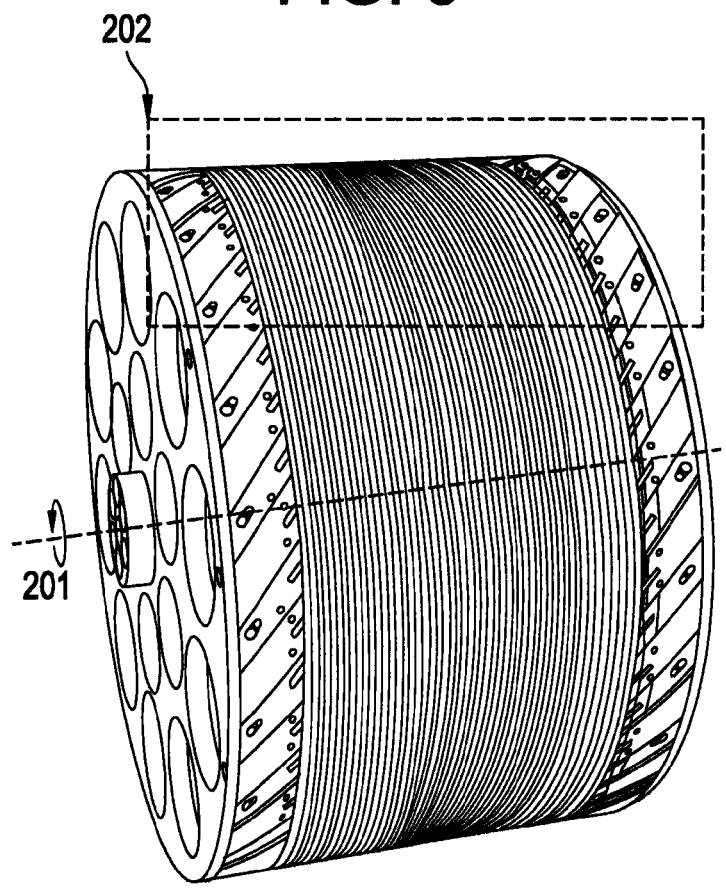
FIGS. 6 and 7 illustrate the drum member wrapped with wire.
Figure 7:
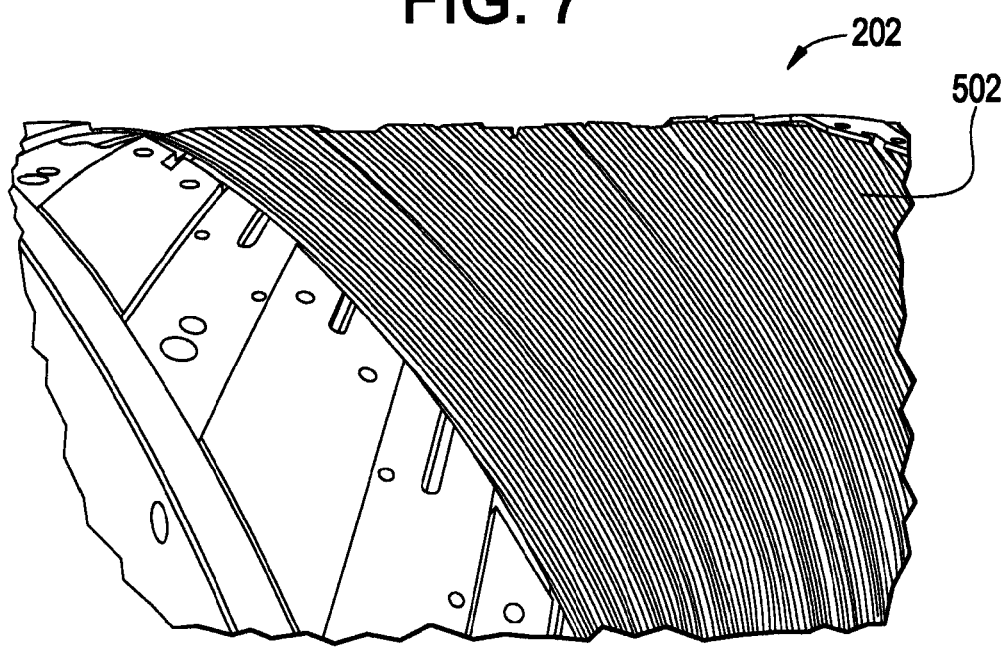

Once the back plates 304 have been secured to the drum member 202, wire is wound around the back plates 304 to form the bristles 108 (of FIG. 1). FIGS. 6 and 7 illustrate the drum member 202 wrapped with wire 502. The winding process includes placing the drum member 202 in a winding apparatus, such as, for example, a winding machine, NC lathe, or manual pitch lathe. The drum member 202 is turned along the axis of rotation 201, and a multi-spool wire payout system winds the wire 502 around the back plates 304 and the drum member 202. The multi-spool wire payout system precisely spaces wraps of the wire 502 at a pitch relative to the axis of rotation 201. Distal ends of the back plates 304 remain unwrapped with the wire 502 to allow space for the alignment features 306. The unwrapped ends of the back plates 304 will be removed in a later process.

Figure 8:
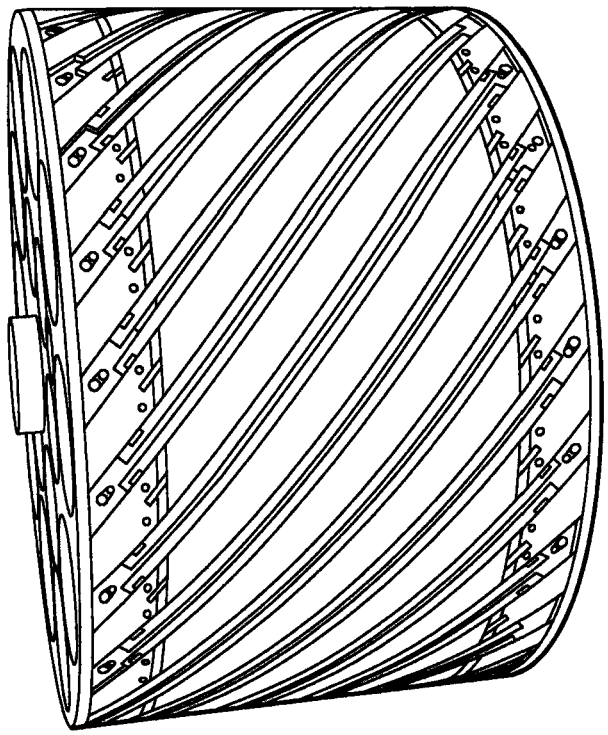
FIGS. 8 and 9 illustrate the drum member of FIG. 2 with front plates assembled.
Figure 9:
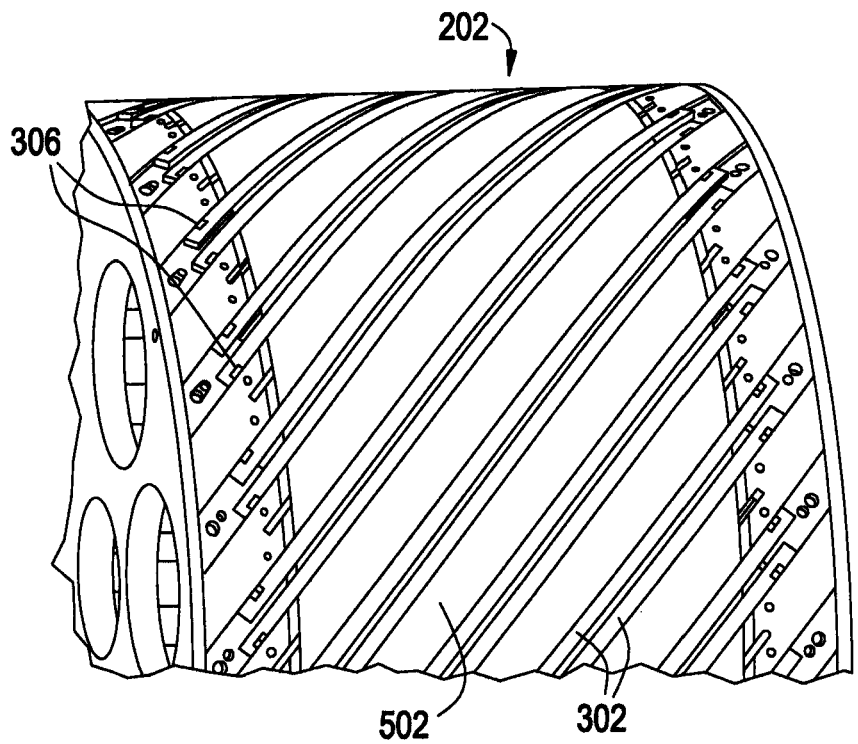
Figure 10:
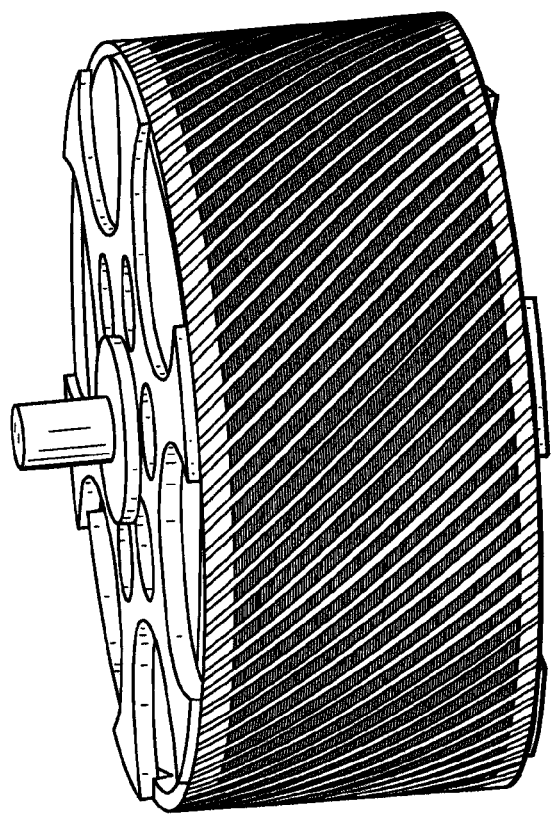
FIGS. 10 and 11 illustrate an alternate embodiment of the drum member with front plates assembled.
Figure 11:
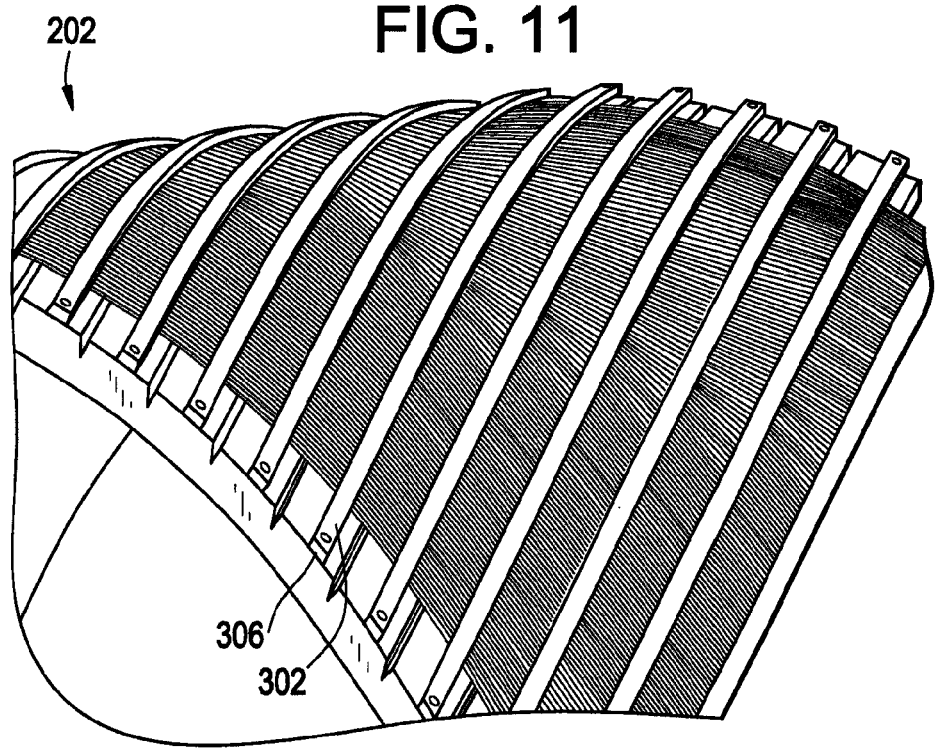

FIGS. 8 and 9 illustrate the placement of the front plates 302 once the drum member 202 has been wrapped with the wire 502. The front plates 302 are disposed on the wire 502 and are aligned and secured with the alignment portions 206 and the alignment features 306. In an alternative embodiment, alignment portions 206 extend radially from the outside diameter of the drum and are used to align the distal ends of the front plate 302 with the back plate 304.

Once the front plates 302 are placed on the wire 502, the back plates 304, front plates 302, and wire are bonded together. The bonding may include welding using for example, an electron beam weld or a laser weld.

Figure 12:
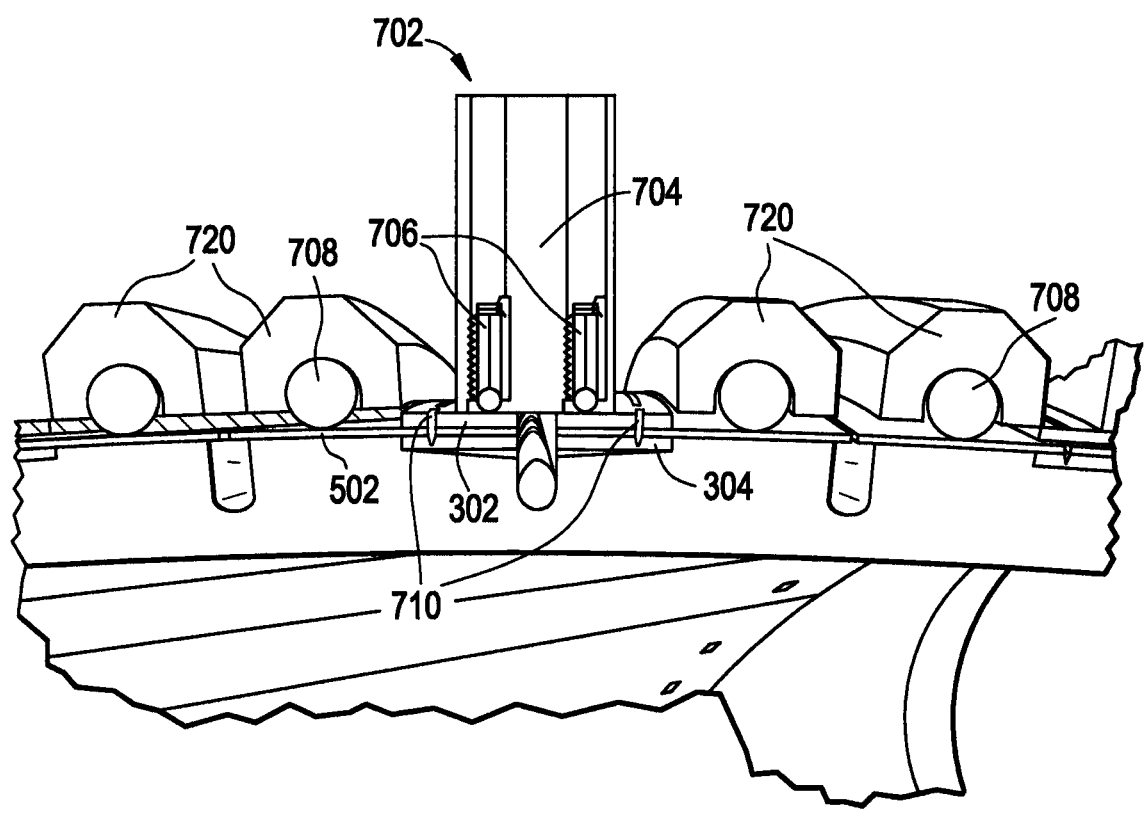
FIG. 12 is a side cut away view of an exemplary embodiment of a clamp.

FIG. 12 illustrates a side cut away view of an embodiment of a clamp used in the bonding process. A helical clamp 702 is clamped to the drum member 202 at the brush locations. The helical clamp 702 is secured to ends of the drum member 202. The helical clamp 702 imparts force along the length of the front plates 302 of adjacent brushes that compresses the front plates 302, the wire 502, and the back plates 304. The compression provides sufficient contact of the components for bonding. The helical clamp 702 includes a body portion 704, a clamp portion 706, and a rope seal portion 708. The body portion 704 provides a surface to secure the helical clamp 702 to the drum assembly 202, and in the illustrated embodiment, includes cavities that secure clamp portions 706. A plurality of clamp portions 706 may be used to provide a uniform compression along the length of the front plate 302. The clamp portions 706 in the illustrated embodiment are spring plungers that use a spring to apply clamping force. Other embodiments may include clamp portions 706 that include, for example, set screws, jacking screws, spring loaded helical bar segments, or pneumatic or hydraulic actuated clamps.

Once the helical clamps 702 are clamped to the drum member 202, the bonding process is performed. A weld 710 is shown in FIG. 12. The weld 710 bonds the front plate 302, the wire 502, and the back plate 304 together. The compression provided by the helical clamps 702 ensures a minimum gap between the front plate 302, the wire 502, and the back plate 304 during thermal expansion caused by the bonding process. The illustrated embodiment of the weld 710 is an energy beam weld such as, for example, an electron beam or a laser beam weld through the front plate 302 and the back plate 304. The shrinkage of the weld 710 pulls the front plate 302 and the back plate 304 together—reducing the gap between the front plate 302 the wire 502 and the back plate 304. The weld 710 and the use of a beam welding process that allows control of the shape of the weld 710 and the heat used in welding reduces distortion of the brush assembly 102. Once the bonding process is complete, the wire 502 may be cut to partially form the brush assembly 102.

The rope seal portion 708 is disposed in a second cavity of the body portion 704 or on a separate clamp 720 and facilitates the cutting process. The rope seal portion 708 is a temperature resistant compliant material that tightly secures the wire 502 in the cutting process. The rope seal portion 708 also protects the wire 502 from possible weld splatter during the bonding process. The cuts may be performed by, for example, a laser cutting process, a plasma cutting process, or a mechanical cutting process. The cutting channels 406 improve the cutting process by providing space for a clean cut, and for wire debris resulting from the cutting process to rest.

Figure 13:
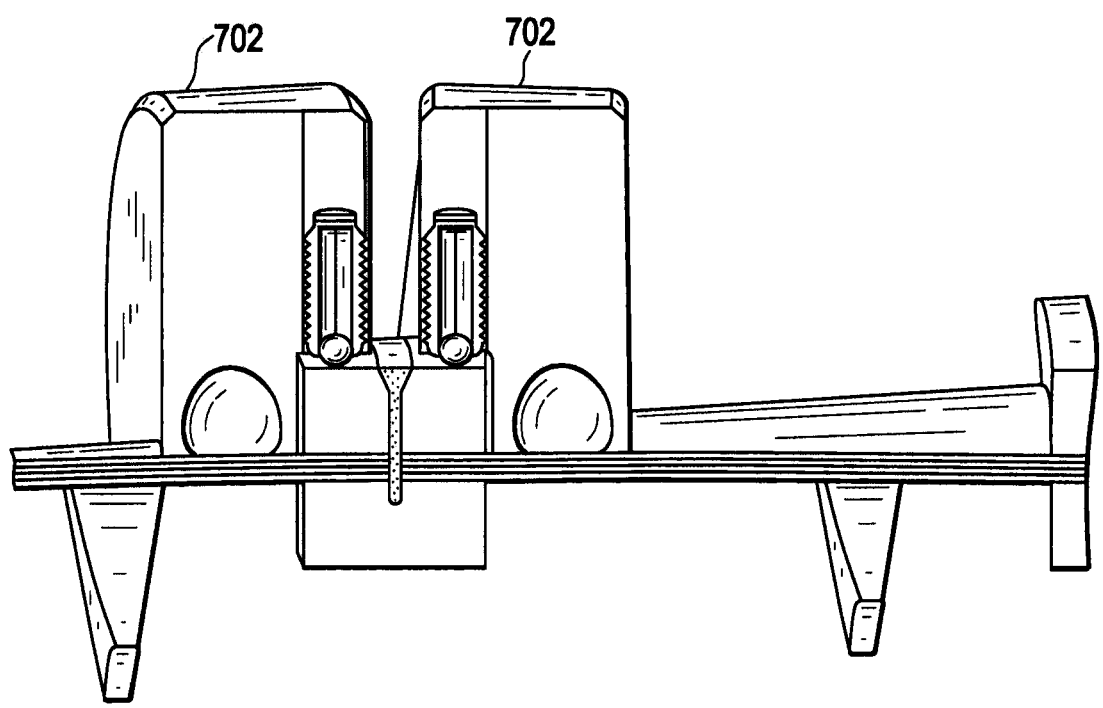
FIG. 13 is a side cut away view of an alternate exemplary embodiment of a clamp.

FIG. 13 illustrates a side cut away view of an alternate exemplary arrangement of the helical clamp 702 used in the bonding process. The illustrated embodiment of FIG. 13 includes two helical clamps 702 used to compress the front plate 302, the wire 502, and the back plate 304 together when additional clamping force is desired.

Figure 14:
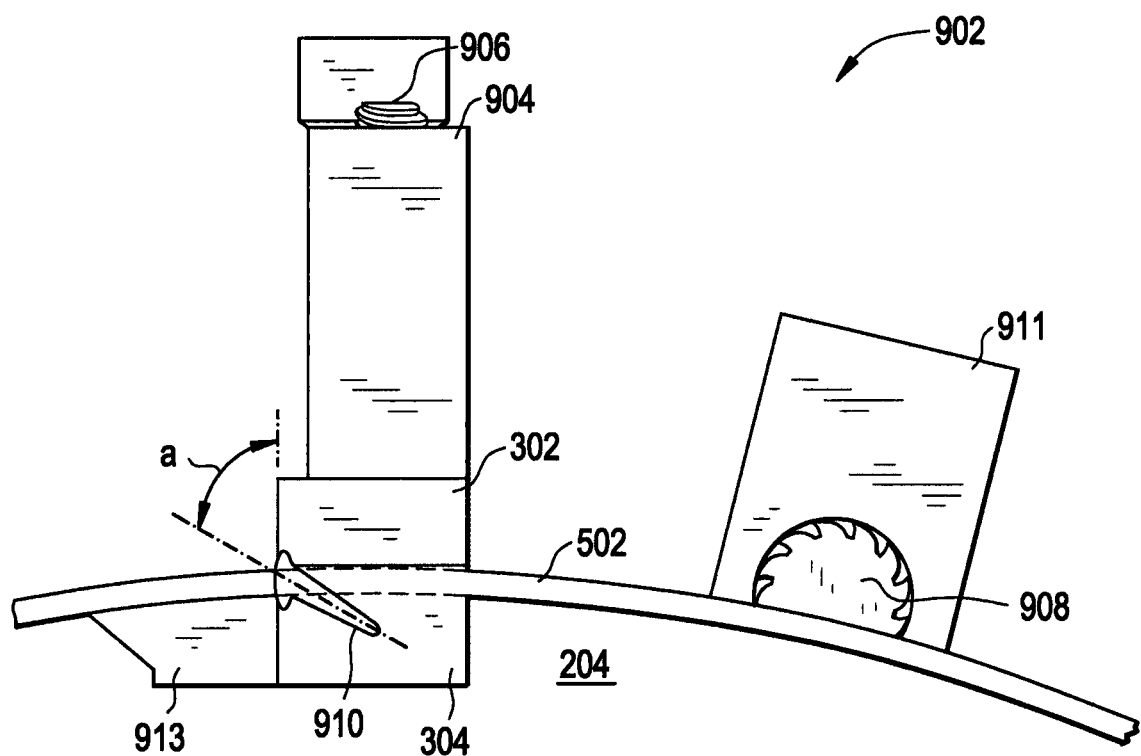
FIG. 14 is a side cut away view of another alternate exemplary embodiment of a clamp.

FIG. 14 illustrates a side cut away view of another alternate exemplary embodiment of a helical clamp 902. The helical clamp 902 includes a body portion 904, a clamp portion 906, and a rope seal portion 908. The helical clamp 902 functions similarly to the exemplary embodiment of the helical clamp 702 described above, however, rope seal portion 908 is not secured in the body portion 904, and is secured in a separate rope seal body portion 911. The geometry of the body portion 904 allows a weld 910 to be made along the longitudinal edge of the front plate 302 and the back plate 304 on an angle (a) to bond the front plate 302, the wire 502, and the back plate 304. A relief cavity 913 may be included in the drum member 202 surface 204 to allow clearance for the bonding process and a space for cutting the wire 502 (described below).

Figure 15:
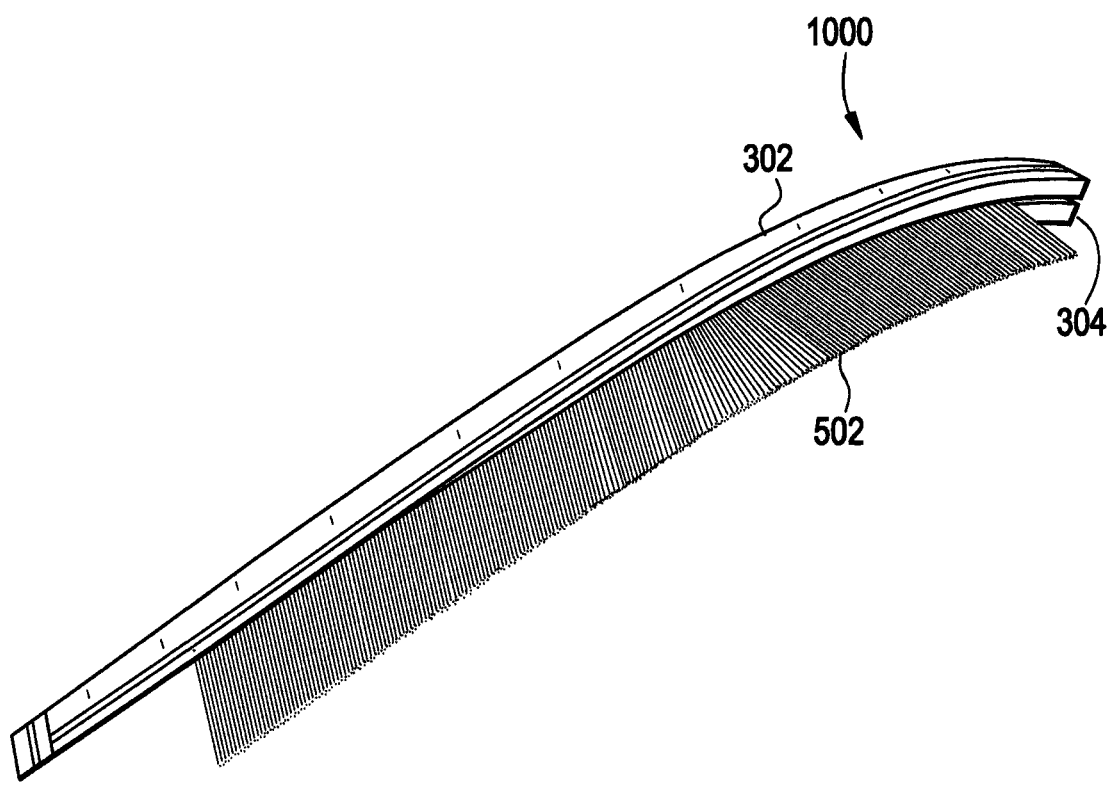
FIG. 15 is a perspective view of an exemplary embodiment of a helically shaped joined brush assembly.

FIG. 15 illustrates a perspective view of an example of a brush assembly 1000 that includes the assembled front plate 302, the wire 502, and the back plate 304 following the bonding and cutting processes. The brush assembly 1000 is curved in a helical shape and will be straightened and flattened to form a straight stock.

Figure 16:
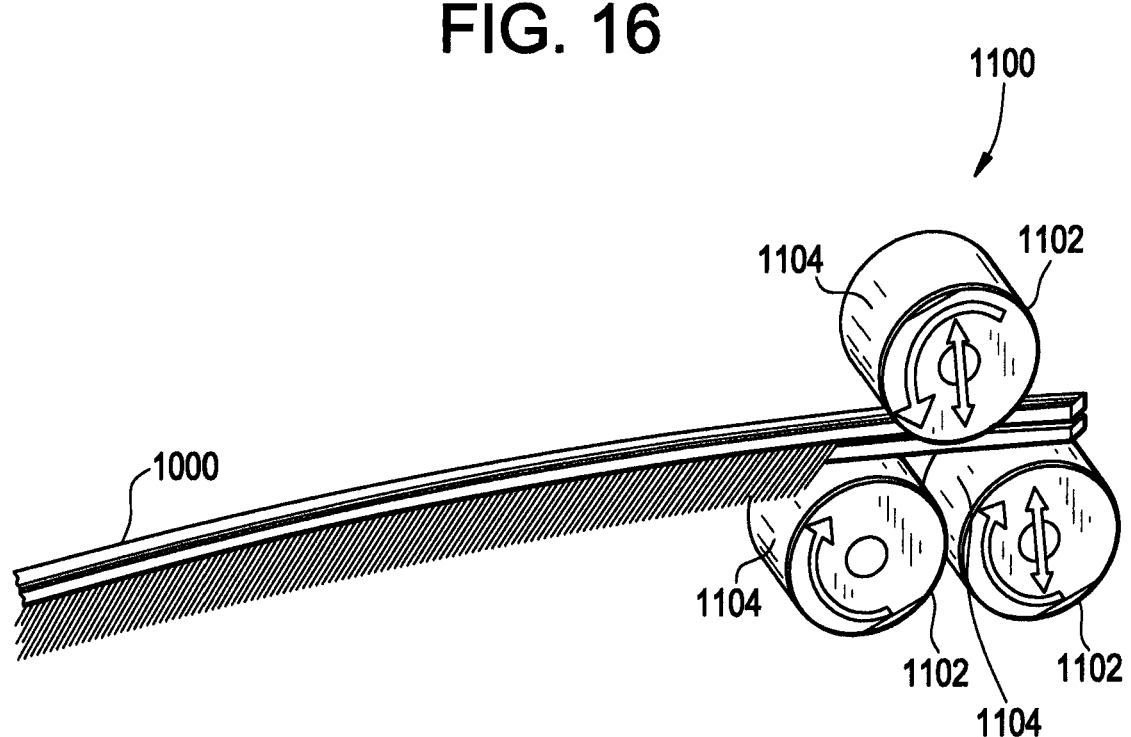
FIG. 16 is an example of a method for side rolling the brush assembly of FIG. 15.

FIG. 16 illustrates an example of a method for straightening and flattening the brush assembly 1000. The method for straightening and flattening the brush assembly 1000 includes processing the brush assembly 1000 with a roll bender 1100 having dies 1102 that straighten and flatten the brush assembly 1000. The roll bender 1100 may include any number of dies, and the process may be repeated until the brush assembly 1000 is within designed straightness and flatness tolerances. The roll setup may include guides that allow feeding the brush into the rollers at a prescribed angle to facilitate proper flattening from the helix.

Figure 17:
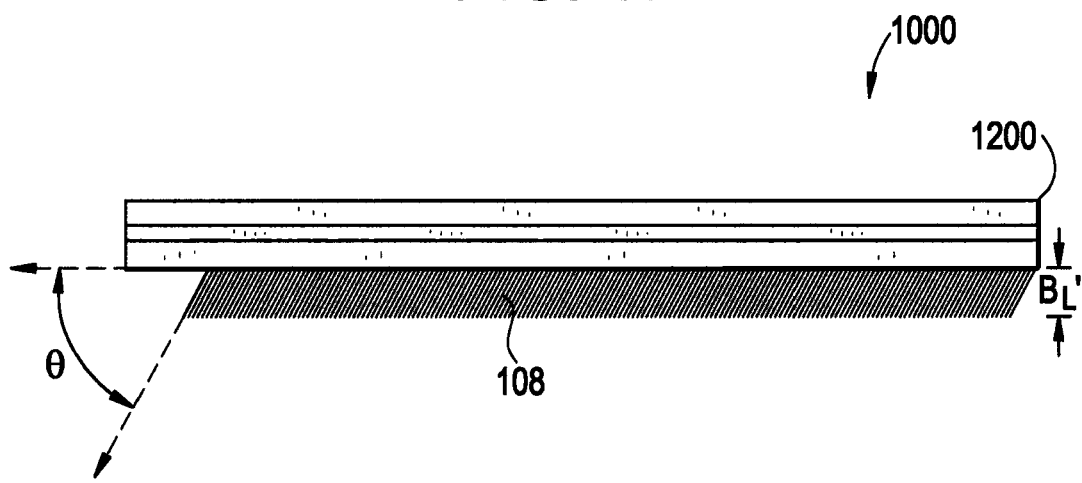
FIG. 17 is a front view of a flattened and straightened brush assembly

FIG. 17 illustrates a front view of an example of a brush assembly 1000. The brush assembly 1000 is a flat and straight assembly that is processed to form a component in the brush seal assembly 102 (of FIG. 1). The brush assembly may be machined to desired stock dimensions. For example, the length, width, and depth dimensions of the bonded front plate 302, the wire 502, and the back plate 304 (frame 1200) may be decreased, and the bristle length ($B_L'$) of the wire 502 may be cut to a desired size. The bristle lay angle (A) is illustrated as the angle between the frame 1200 and the bristles 108.

The methods described above illustrate an efficient, precise, and automated process for forming the brush assembly 1000 to desired stock dimensions. Previous methods for forming brush seals used labor intensive methods that wasted materials in forming an assembly similar to the brush assembly 1000. Once a number of brush assembly 1000 components have been fabricated, they may then be stored as stock for later fabrication of brush seals having a variety of design specifications.

Figure 18:
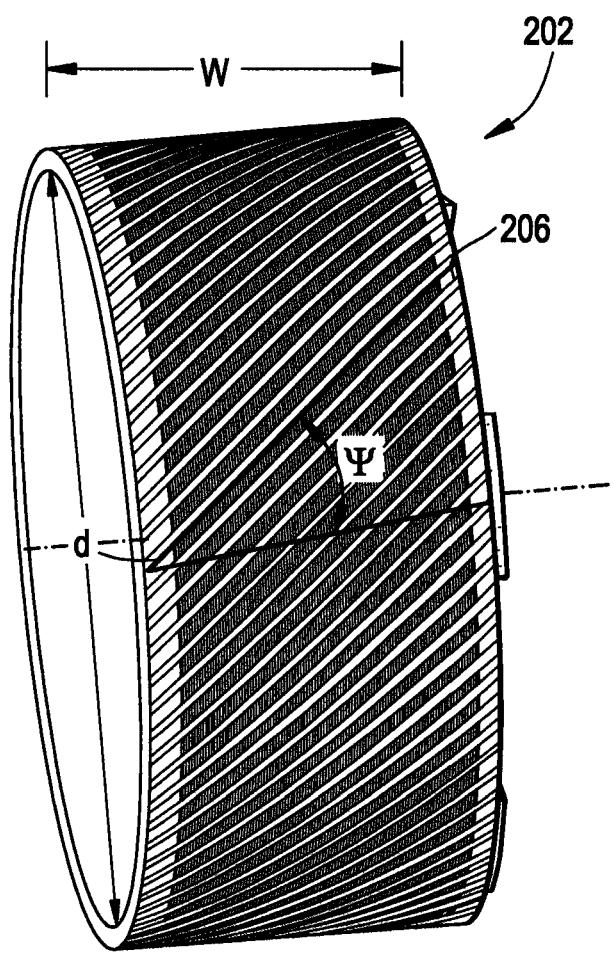
FIG. 18 illustrates the dimensions of the drum member of FIG. 2.
Figure 19:
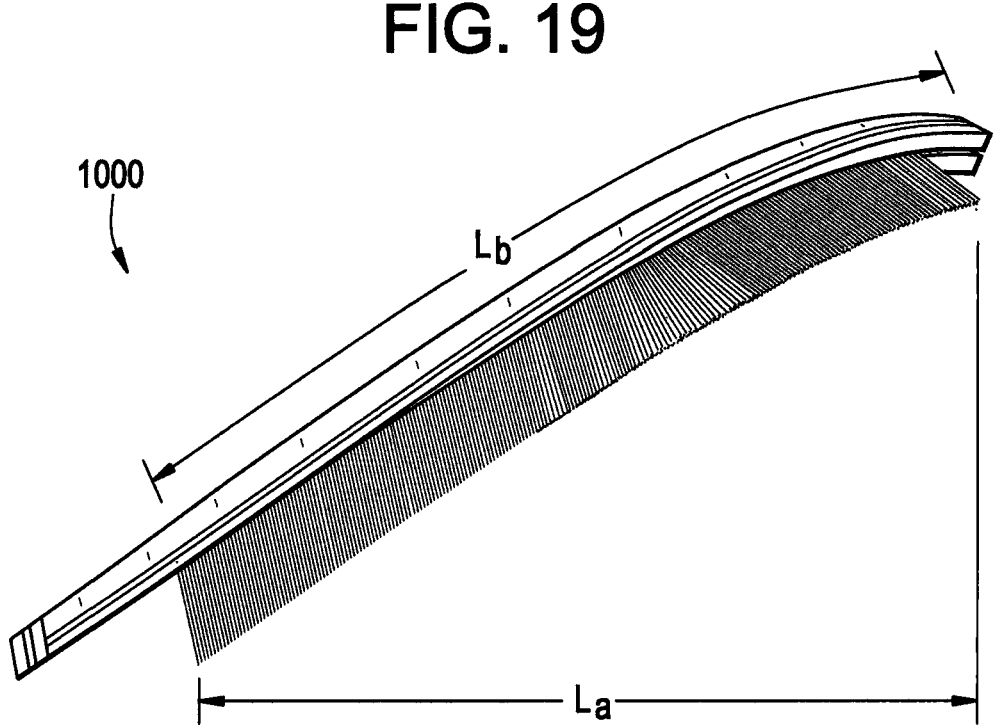
FIG. 19 illustrates the dimensions of the brush assembly of FIG. 15.
Figure 20:
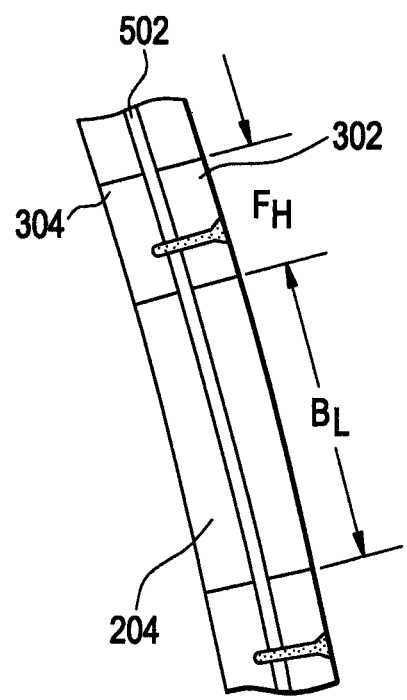
FIG. 20 is a side cut away view illustrating the dimensions of the drum member of FIG. 11.
Figure 21:
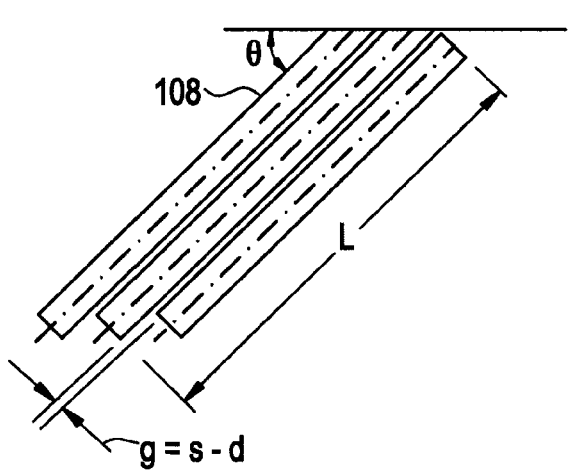
FIG. 21 is a front view of a wire stack of bristles of the brush assembly of FIG. 15.
Figure 22:
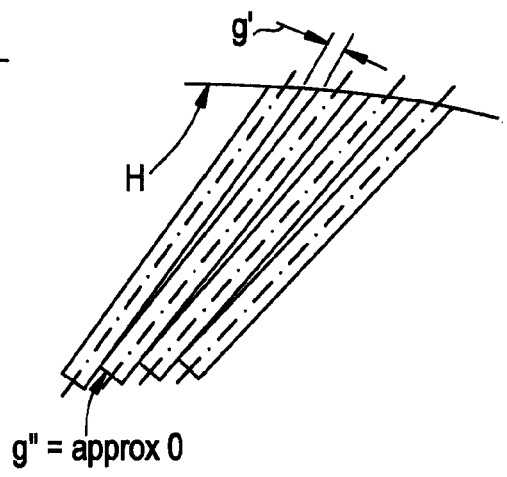
FIG. 22 is an alternate front view of a wire stack of bristles of the brush assembly of FIG. 25.
Figure 23:
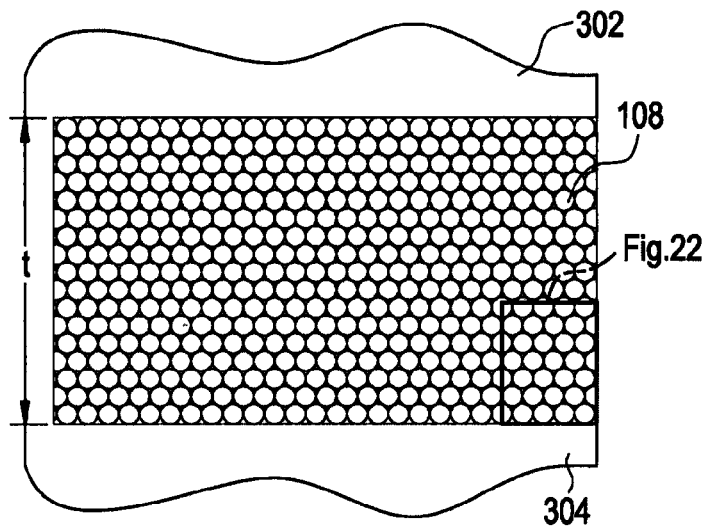
FIG. 23 is a cross section view normal to the bristle axis of a wire stack of bristles of the brush assembly of FIG. 15.
Figure 24:
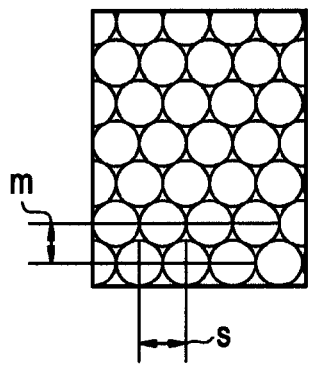
FIG. 24 is close up view of a portion of FIG. 23.

FIGS. 18-20 illustrate the dimensions of the drum member 202 (of FIG. 2) that are used to design a drum member 202 having the proper diameter, width, and alignment portions 206 to fabricate a desired brush assembly 1000. Referring to FIG. 18, helical pitch (h) is the normal distance between two of the helical shaped alignment portions 206 and is defined by $h=\pi*d/(N*(\cos(\Psi)))$, where d=drum member diameter (d/2), N=number of grooves and $\Psi$=helix angle. The helix angle is supplementary to the desired bristle lay angle (θ) (of FIG. 17). For a brush of a desired finish length ($L_b$) an axial length ($L_a$) is calculated, $L_a=L_b*\cos(\Psi)$. The nominal number of brush assemblies 1000 that are fabricated on the drum (Nb) is defined by Nb=$((d*\pi*\cos\Psi)/F_H+B_L)$, where d=drum diameter, $F_H$=brush frame height, and $B_L$=radial brush length from hook to tip FIGS. 21-24 illustrate front and bottom views of a wire stack of bristles 108 of the brush assembly 1000 and brush seal design parameters that may be varied in the fabrication process to result in a uniform and precise spacing of the bristles 108. The uniform and precise spacing of the bristles is difficult to obtain with previous fabrication methods. Referring to FIGS. 23 and 24, a bottom view of a portion of the wire stack of bristles 108 of the brush assembly 1000 is shown. The bottom view illustrates a wire strand spacing distance (s) and a wire strand stack distance (m). FIG. 21 illustrates a front view of a portion of the brush assembly 1000 when the brush assembly 1000 is in a straight stock shape. The bristles 108 have a length (L), are spaced at a distance (g) and lie at and angle (θ). The distance (g) is defined by g=s−d, where (d) is the diameter of the wire strands. The winding process (described above) uses a precision winding apparatus that allows precise spacing of the wire as the wire is wrapped on the drum member 202 (of FIG. 2). The precise spacing allows the distance (g) to be controlled within small tolerances. The precise spacing of the wire strands increases the effectiveness of the designed brush seal. The wire strand stack distance (m) is dependant on the strand spacing distance (s) and the diameter of the wire strands (d), and defined as m=$d*\sin(\cos^1(s/(2d)))$. For a strand spacing where s=d, the calculation of the wire strand distance between rows reduces to m=$d*\cos(30)$. The thickness of the bristle pack (t) affects the stiffness of the brush seal, and is defined as t=d+(n−1)*m, where n=number of wire layers. A bristle density (D), or a number of bristles per circumferential unit is defined as D=$(1/(s*\cos θ))*n$.

When the brush assembly 1000 is bent radially to a diameter (H) to partially form a brush seal, tips of the bristles 108 may contact to form a more effective seal. FIG. 22 shows a portion of the brush assembly 1000 that has been curved to a diameter (H). The curved diameter (H) results in a distance (g") at the tips of the bristles 108 to be approximately zero, and the distance (g') at an upper portion of the bristles 108 to be less than (g) (less than g assumes the bristles are bending about the weld. If the bristles are bending about the pinch point (hook) than g'=g.) The precise spacing (g) facilitated by the methods described above allow the (g') and (g") distances to meet desired design specifications.

Once the brush assembly 1000 has been fabricated, stock brush assemblies 1000 may be further processed to fabricate a brush seal assembly to desired specifications similar to the example of a brush seal assembly 102 (of FIG. 1). The further processing may include, for example, bending the brush assembly 1000 and removing material from the front plate 302, the back plate 304, or cutting the bristles 108 to meet design specifications of the desired brush seal assembly 102.

Figure 25:
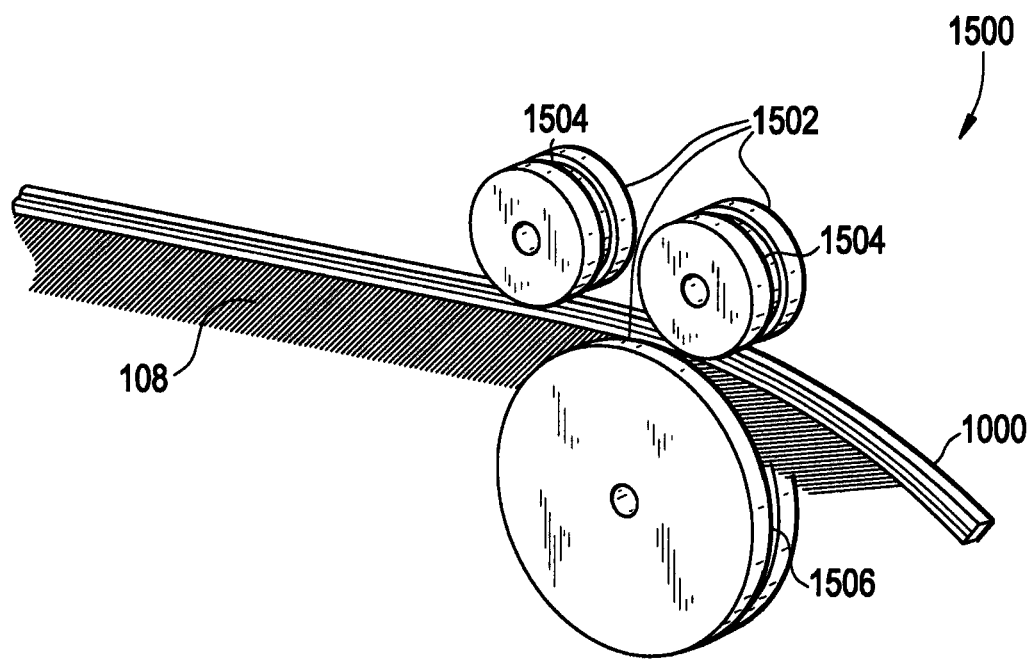
FIG. 25 is another example of a method for processing the brush assembly of FIG. 17.

FIG. 25 illustrates an example of a method for bending the brush assembly 1000 radially to a designed hook diameter of a brush seal. The method includes processing the brush assembly 1000 with a roll bender 1500 having dies 1502 that bend the brush assembly 1000 to a desired hook diameter. The roll bender 1500 may include any number of dies 1502, and the process may be repeated until the brush assembly 1000 is within designed tolerances. The illustrated embodiment includes dies 1502 that include grooves 1504 that guide the plates of the brush assembly 1000. Some of the dies 1502 may include a groove 1506 that allows the bristles 108 of the brush assembly 1000 to pass through the roll bender 1500 without crushing the bristles 108. Other types of apparatuses may be used to bend the brush assembly 1000 including, for example press brakes.

Once the brush assembly 1000 has been bent radially to a designed hook diameter, plates may be fabricated and attached to the brush assembly 1000. The plates may be fabricated from stock materials such as, for example steel plate stock and cut to desired dimensions using various methods such as, for example, cnc punch, conventional machine, laser cutting, water jet cutting, plasma cutting, or wire EDM.

Figure 26:
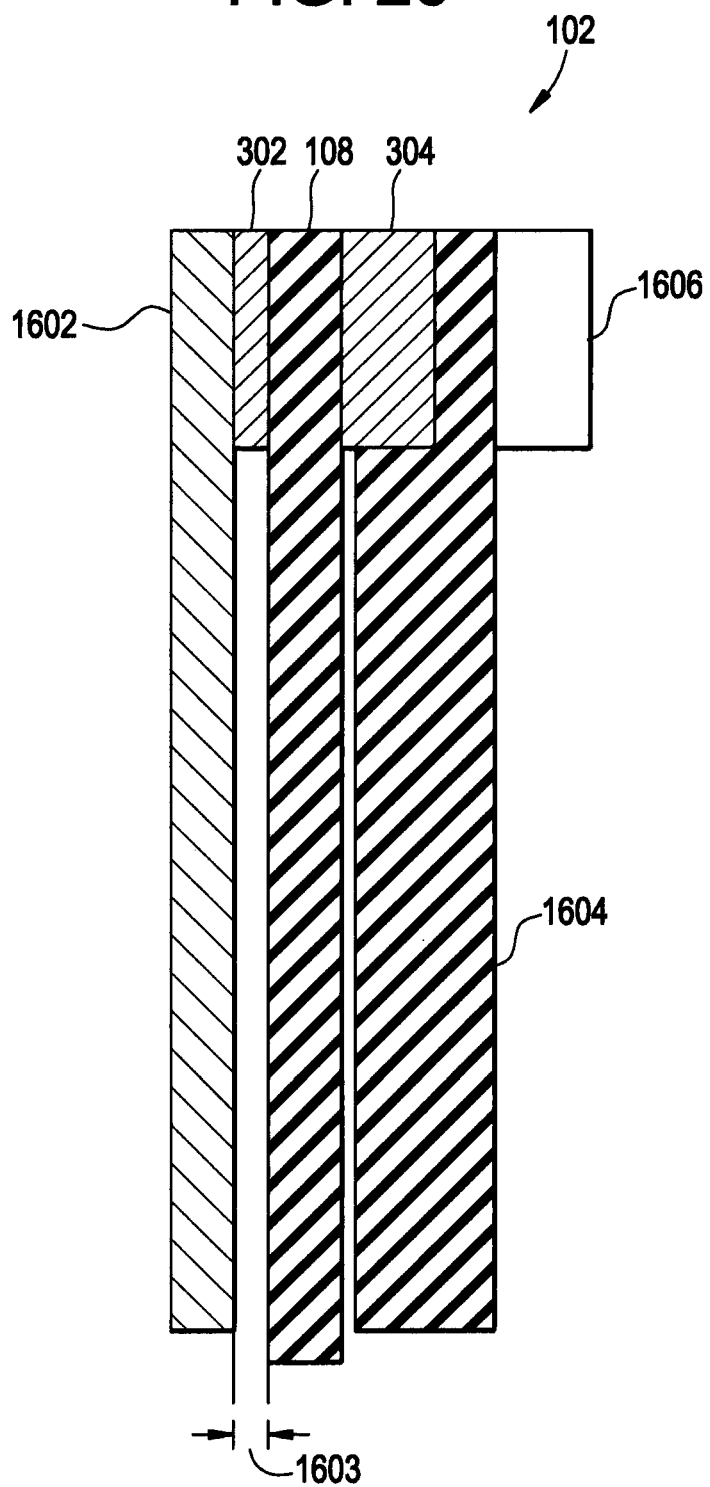
FIG. 26 is a side partially cut away view of an exemplary embodiment of the brush seal assembly of FIG. 1.

FIG. 26 illustrates a side partially cut away view of an exemplary embodiment of the brush seal assembly 102 (of FIG. 1). In the illustrated embodiment, a forward plate 1602 has been attached to the front plate 302. The front plate 302 may be machined in a previous process to define a dimension of a front plate gap 1603. The front plate gap 1603 is defined by the final thickness of front plate 302. A pressure plate 1604 is attached to the back plate 304. An alignment portion 1606 is attached to the pressure plate 1604. The alignment portion 1606 is used to align the brush seal assembly 102 for installation. The embodiment of the brush seal assembly 102 includes the forward plate 1602 and the pressure plate 1604. Alternate embodiments may include a brush seal assembly 1029 having only the forward plate 1602 and no pressure plate 1604, or a brush seal assembly 1028 having only the pressure plate 1604 and no forward plate 1602.

Figure 27:
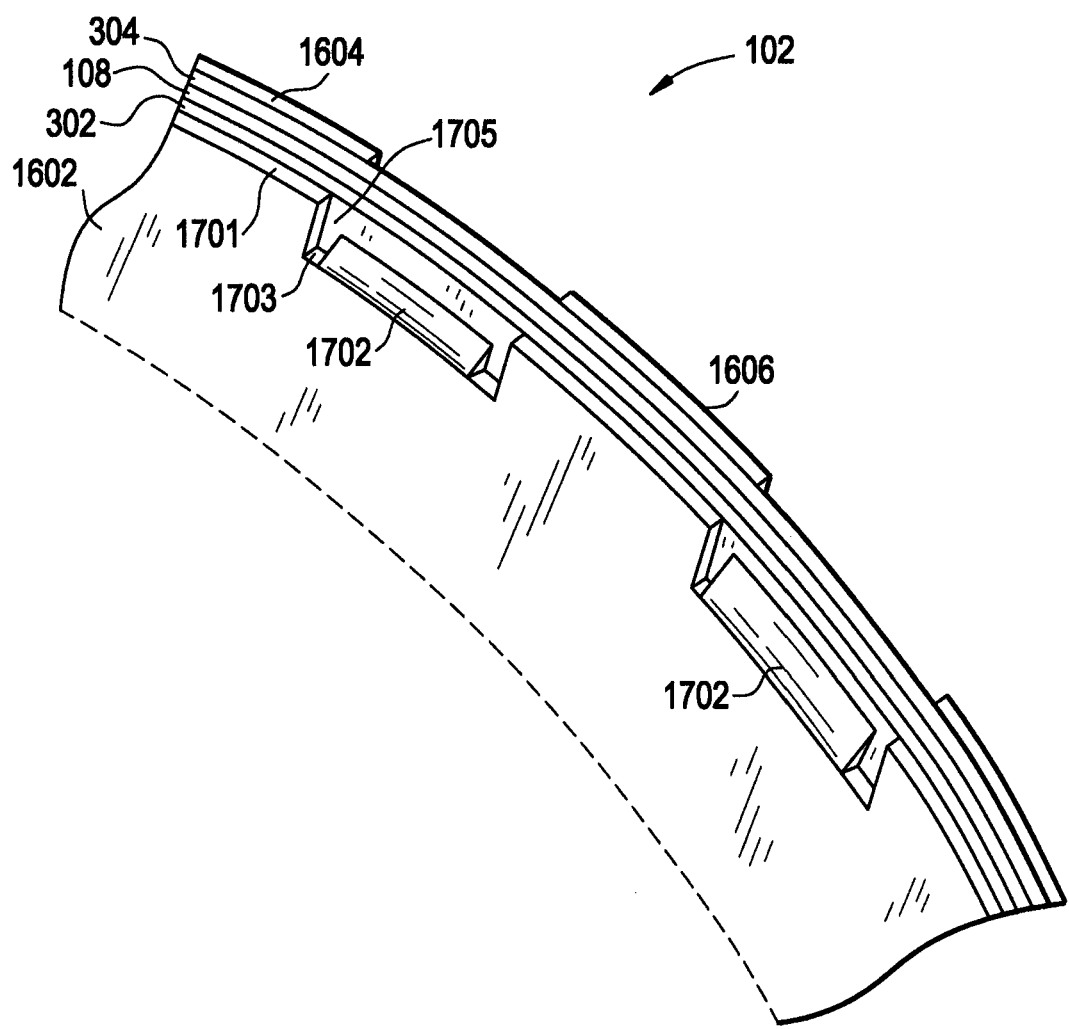
FIG. 27 is a perspective view of an alternate exemplary embodiment of a brush seal assembly.

FIG. 27 illustrates a perspective view of an alternate exemplary embodiment of a brush seal assembly 102. The brush seal assembly 102 includes the front plate 302, the wire bristles 108, and the back plate 304. The front plate 302, the wire bristles 108, and the back plate 304 may be fabricated using the methods described above, or may be fabricated using other methods. The forward plate 1602 includes a castellated top edge 1701 that defines notches having a notch surface 1703 in the plate 1602. The castellated top edge 1701 may be formed using a suitable cutting process, that may include, for example, CNC punch, conventional machine, laser cutting, water-jet, plasma cut, or wire EDM. The forward plate 1602 is attached to a surface 1705 of the front plate 302 with a fillet weld 1702. The fillet weld 1702 is applied to the notch surface 1703 and the surface 1705 of the front plate 302. As the fillet weld 1702 cools, the forward plate 1602 is pulled into parallel alignment with the surface 1705 of the front plate 302. The pressure plate 1604 may be fabricated to include a castellated top edge similar to the castellated top edge of 1701 of the forward plate 1602. The pressure plate 1604 may be attached to the back plate 304 using fillet welds similar to the fillet weld 1702. The embodiments and methods described above regarding the forward plate 1602 and the pressure plate 1604 offer an efficient and economic method for fabricating a brush seal assembly and result in a brush seal assembly with a forward plate and pressure plate that are effectively parallel to the front plate and back plate.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for fabricating a brush seal assembly comprising:
   a drum member having an axis of rotation and a surface partially defining an outer diameter of the drum member;
   an alignment portion disposed on the surface operative to align and secure a front plate member and a back plate member of a brush seal assembly along a helical curve.

2. The system of claim 1, wherein the system comprises a winding apparatus operative to rotate the drum member on the axis of rotation and wrap a wire around the drum and the back plate.

3. The system of claim 1, wherein the alignment portion is a channel having a helical curve profile.

4. The system of claim 1, wherein the alignment portion includes an alignment pin operative to align and secure the front plate member and the back plate member.

5. The system of claim 1, wherein the alignment portion includes a registration surface on the drum member.

6. The system of claim 1, wherein the front plate member includes a surface operative to contact a registration surface on the drum member and align the front plate member with the back plate member.

7. The system of claim 1, wherein the surface includes a cutting cavity.

8. The system of claim 1, wherein the system includes a first clamping apparatus operative to apply a clamping force to the front plate member.

9. The system of claim 8, wherein the first clamping apparatus is a helical shape.

10. The system of claim 9, wherein the system comprises a second clamping apparatus operative to apply a clamping force to a wire disposed on the front plate member.

* * * * *